United States Patent [19]

Rigosi et al.

[11] Patent Number: 5,494,953
[45] Date of Patent: Feb. 27, 1996

[54] POLYPROPYLENE COMPOSITION WITH A HIGH CONTENT OF HEAVY MINERAL FILLER(S), SUITABLE FOR COATING METAL PIPES

[75] Inventors: Gian L. Rigosi; Roberto Marzola, both of Ferrara, Italy

[73] Assignee: Montell North America Inc., Wilmington, Del.

[21] Appl. No.: 409,366

[22] Filed: Mar. 23, 1995

[51] Int. Cl.$^6$ ............................................. C08K 3/10
[52] U.S. Cl. ........................ 524/225; 524/394; 524/423; 524/443; 428/461
[58] Field of Search .................... 524/225, 394, 524/423, 443; 428/461

[56]  References Cited

U.S. PATENT DOCUMENTS 4,013,374  3/1977  Weiler et al. ........................ 404/25
4,551,497  11/1985  Shinozuka et al. .................. 524/423
4,686,257  8/1987  Mitsuno et al. ...................... 524/423
5,169,884  12/1992  Lindemann et al. .................. 524/44
5,331,046  7/1994  Chang et al. ........................ 524/423

FOREIGN PATENT DOCUMENTS 101650  2/1984  European Pat. Off. .
2558483  7/1977  Germany .

*Primary Examiner*—Kriellion S. Morgan

[57]  ABSTRACT

Polymer composition comprising a propylene polymer matrix containing (percentages by weight with respect to the total composition):

A) 60–90% of one or more heavy mineral fillers, the specific weight of which is or are greater than or equal to 3; and B) 0.1–4% of a compatibilizer for the filler(s);

where said compositions has a MFRL ranging from 1 to 10 g/10 minutes, an elongation at break ranging from 1.5 to 100%, and flexural modulus ranging from 3,000 to 10,000 Mpa.

6 Claims, No Drawings

POLYPROPYLENE COMPOSITION WITH A HIGH CONTENT OF HEAVY MINERAL FILLER(S), SUITABLE FOR COATING METAL PIPES

The present invention relates to a polypropylene composition with a high content of heavy mineral filler(s), particularly suitable for coating metal pipes by extrusion coating processes.

It is known that polyolefins, and propylene polymers in particular, can be conveniently used to coat the outside surface of metal pipes to be used for conveying liquids and gases. In fact, propylene polymers allow one to obtain coatings which are highly resistant to corrosion and possess optimum mechanical properties. However, if the pipes coated with said polymers are to be used in marine pipelines, one often has to add additional external layers of heavy materials, in particular cement, to keep the pipelines from floating. These additional layers are both breakable and not always easy to apply to the pipes.

There is still a need for a material that would allow one to obtain coatings with a good balance of weight, corrosion resistance and high mechanical properties, without having to additional layers of heavy materials.

As an answer to the above need this invention provides a propylene polymer composition containing a high quantity of one or more heavy mineral fillers, said compositions being easy to apply to the outside surface of the metal pipes to form single- or multilayer coatings displaying the above mentioned balance of properties.

The multilayer coatings can comprise layers of plastic materials with different properties, such as foamed plastics for example.

Therefore, the present invention provides a composition comprising a propylene polymer matrix containing (percentage by weight with respect to the total composition):

A) 60–90%, preferably 65–85%, more preferably 75–85%, of one or more heavy mineral fillers having specific weight greater than or equal to 3, such as barium sulfate or zirconium silicates for example;

B) 0.1–4%, preferably 0.5–2%, of a compatibilizer for the filler(s), preferably selected from stearic acid derivatives, such as inorganic stearates and stearamides, for example Ca and Zn stearates;

wherein said composition has a Melt Flow Rate MFRL (according to ASTM D 1238 Condition L) ranging from 1 to 10 g/10 minutes, preferably from 1.7 to 6 g/10 minutes, an elongation at break (ASTM D 638) ranging from 1.5 to 100%, preferably from 3 to 100%, and flexural modulus (ASTM D 790) ranging from 3,000 to 10,000 MPa, preferably from 4,000 to 6,000 MPa.

The above composition can easily be applied to the external surface of metal pipes by using extrusion techniques known in the art, because it possesses an adequately high viscosity in the molten state which enables it to withstand the stress they must undergo during the traditional coating processes, thus avoiding melt fracture problems. To obtain an optimal adhesion to the pipe surface it is best to coat said surface with a layer of a hot melt composition of the type commonly used in the art (based on maleic anhydride modified polypropylene for example), before applying the composition of the invention.

The propylene polymers that can be used in the composition of the present invention comprise:

1) isotactic polypropylene;

2) crystalline copolymers of propylene with ethylene and/or other α-olefins, such as 1-butene, 1-hexene, 1-octene and 4-methyl-1-pentene; and 3) heterophasic polymers obtained by mechanical mixing or sequential polymerization, comprising a fraction composed of a propylene homopolymer or the copolymers of item (2), and a copolymer fraction composed of elastomeric copolymers, such as ethylene propylene rubbers (EPR) or ethylene propylene diene monomer rubbers (EPDM).

Examples of a compatibilizer for the fillers include materials that are different from the stearic acid derivatives, e.g. maleic anhydride modified polypropylene or polypropylene modified with other compounds containing carboxylic groups, vinyl-substituted alkoxysilanes and peroxides.

However, the best elongation at break values (greater than or equal to 3%) are obtained with the stearic acid derivatives.

The compositions of the present invention can be prepared by known techniques for the preparation of olefin polymer blends with fillers. For example, one can use Banbury, Buss or Brabender mixers at temperatures ranging from 180° C. to 260° C.

The following examples are given to illustrate and not limit the present invention.

Example 1

The following materials are introduced in a Buss 200 mixer (percentages by weight):

| | |
|---|---|
| Homopolymer polypropylene with MFRL 6 g/10 min. | 21.5% |
| Barium sulfate | 76% |
| Calcium stearate | 0.5% |
| Homopolymer polypropylene with MFRL 10 g/10 min. | 2% |

Both the above propylene homopolymers have isotactic index in xylene at ambient temperature equal to 96%. The barium sulfate is Barite Primera P 25, with a specific weight of 4.4, produced by Minerals Gironda S.A. and marketed by Hulls & Capelli.

The above materials are extruded at a temperature of 230° C. in a Buss mixer.

A portion of the resulting composition is used for an extrusion test with a single-screw flat-die extruder at a temperature of about 190° C., thus obtaining a homogeneous extrudate without melt fracture problems. This shows that the composition is suitable for use in pipe extrusion coating processes.

To determine the mechanical properties, another portion of the composition is used to prepare specimens, in the form of 120 mm×120 mm×3 mm plaques, by injection molding at 230° C.

The MFRL, density and mechanical characteristics of the above mentioned composition are shown in Table 1.

Comparative example 1

The following materials are introduced in a 2 liter Banbury mixer (percentages by weight):

| | |
|---|---|
| Homopolymer polypropylene with MFRL 3.5 g/10 min. | 35% |
| Barium sulfate | 65% |

The above propylene homopolymer has an isotactic index of 96%. The barium sulfate is the same as for Example 1.

The above mentioned materials are mixed in the Banbury mixer for 3 min at a temperature of 220° C. The resulting composition is discharged, and a portion of it is used for the same extrusion test of Example 1. However, this time the melt does fracture, and therefore it is impossible to work with it.

To determine the mechanical properties, another portion of the composition is used for the preparation of specimens as in Example 1. The MFRL, density and characteristics of the above composition are shown in Table 1.

TABLE 1

|  | Example 1 | Comparative example 1 |
|---|---|---|
| Density (g/cm$^3$) | 2.2 | 1.85 |
| MFRL (g/10 min.) | 5.3 | 1.4 |
| Flexural modulus (MPa) | 5000 | 2000 |
| Elongation at break (%) | 45 | 30 |

Note: the density is measured according to BS 4370

Example 2

The following materials are introduced in a 65 cm$^3$ Brabender mixer (percentages by weight):

Polypropylene homopolymer
   with MFRL 3.35 g/10 min. 23.5%

Zirconium silicate 76%

Calcium stearate 0.5%

The above propylene homopolymer is the same as in Comparative example 1; zirconium silicate is Zircon 30 MY, with specific weight of 4.6, produced by the Tisand Ltd (South Africa), marketed by Cam Prodotti S.p.A., and having ZrO$_2$ content exceeding 65% by weight.

The above mentioned materials are mixed in the Brabender for 3 minutes at a temperature of 220° C. The composition thus obtained is discharged, and a portion of it is used in the same extrusion test of Example 1. As in Example 1, the extrudate obtained in this case is also homogeneous and there were no melt fractures problems.

To determine the mechanical properties, another portion of the composition is used for preparing specimens as in Example 1. The resulting properties are as follows:

| Density | 2.34 g/cm$^3$ |
|---|---|
| MFRL | 6.2 g/10 min. |
| Flexural modulus | 5800 MPa |
| Elongation at break | 5% |

Hence, this invention provides a propylene polymer composition with a high heavy mineral filler content, that is useful for coating metal pipes.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A composition consisting essentially of a propylene polymer matrix containing (percentages by weight with respect to the total composition):
   A) 60–90% of one or more heavy mineral fillers having a specific weight greater than or equal to 3;
   B) 0.1–4% of a compatibilizer for the filler(s); said composition having a MFRL ranging from 1 to 10 g/10 minutes, an elongation at break ranging from 1.5 to 100% and flexural modulus ranging from 3,000 to 10,000 MPa.

2. The composition of claim 1, wherein the compatibilizer for the filler(s) is a stearic acid derivative.

3. The composition of claim 2, wherein the stearic acid derivative is an inorganic stearate or a stearamide.

4. The composition of claim 1, wherein the heavy mineral filler is barium sulfate or a zirconium silicate.

5. A method for coating the external surface of a metal pipe comprising the step of coating by extrusion said external surface with the composition of claim 1.

6. A metal pipe whose external surface is coated with a layer of the composition of claim 1.

* * * * *